P. E. HOLT.
TRACTOR PLOW.
APPLICATION FILED OCT. 16, 1912.
1,179,183.
Patented Apr. 11, 1916.
2 SHEETS—SHEET 1.
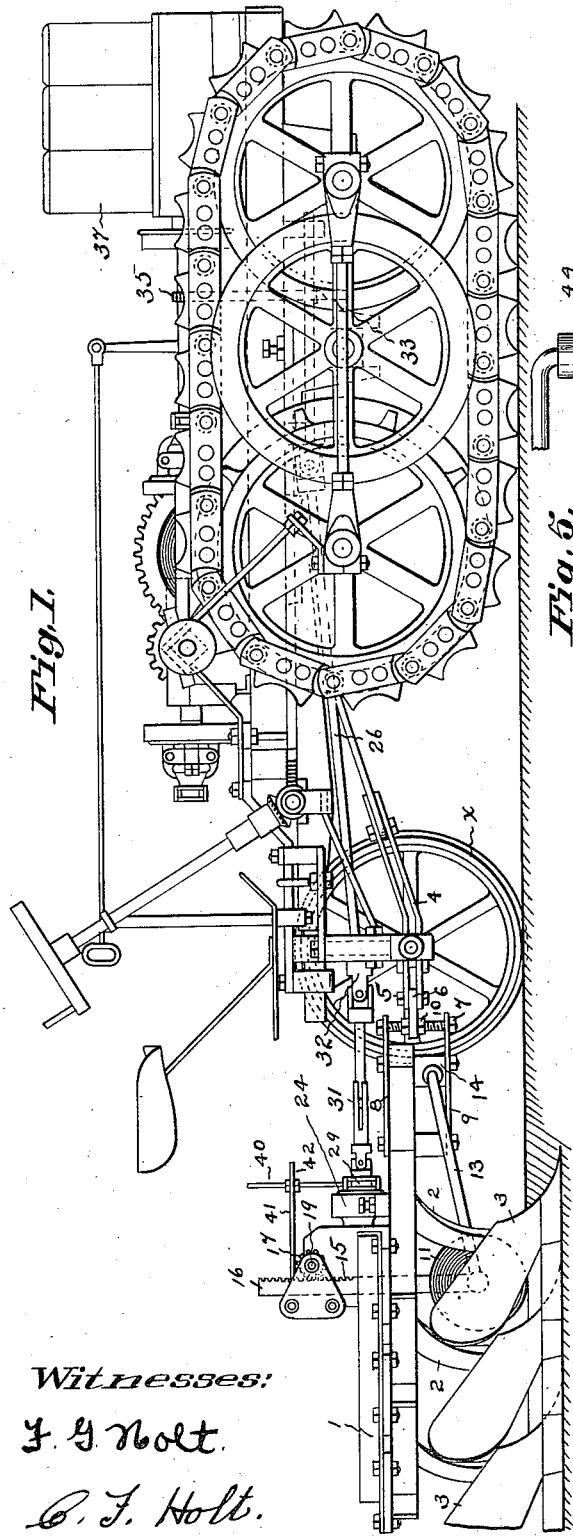
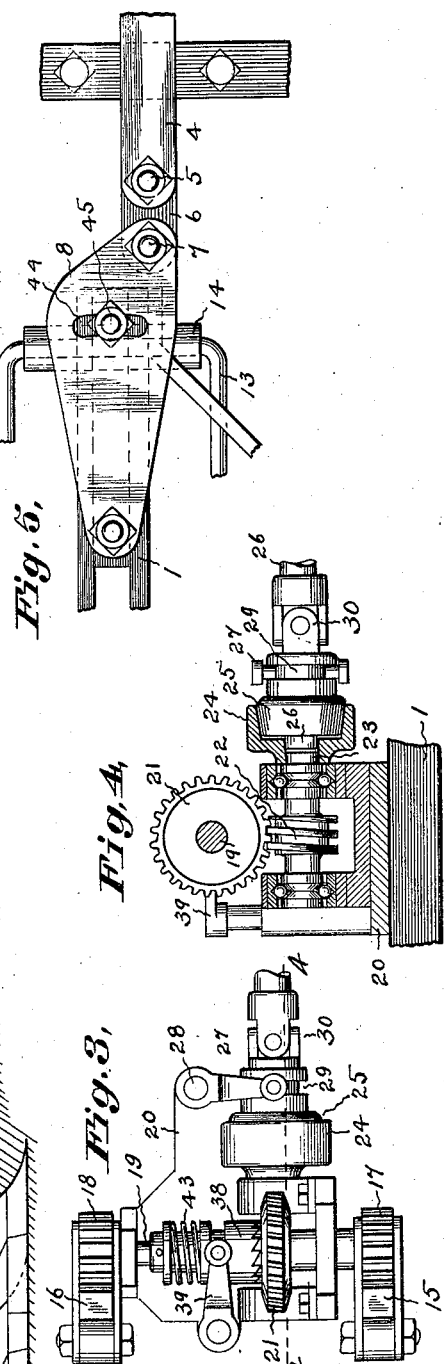

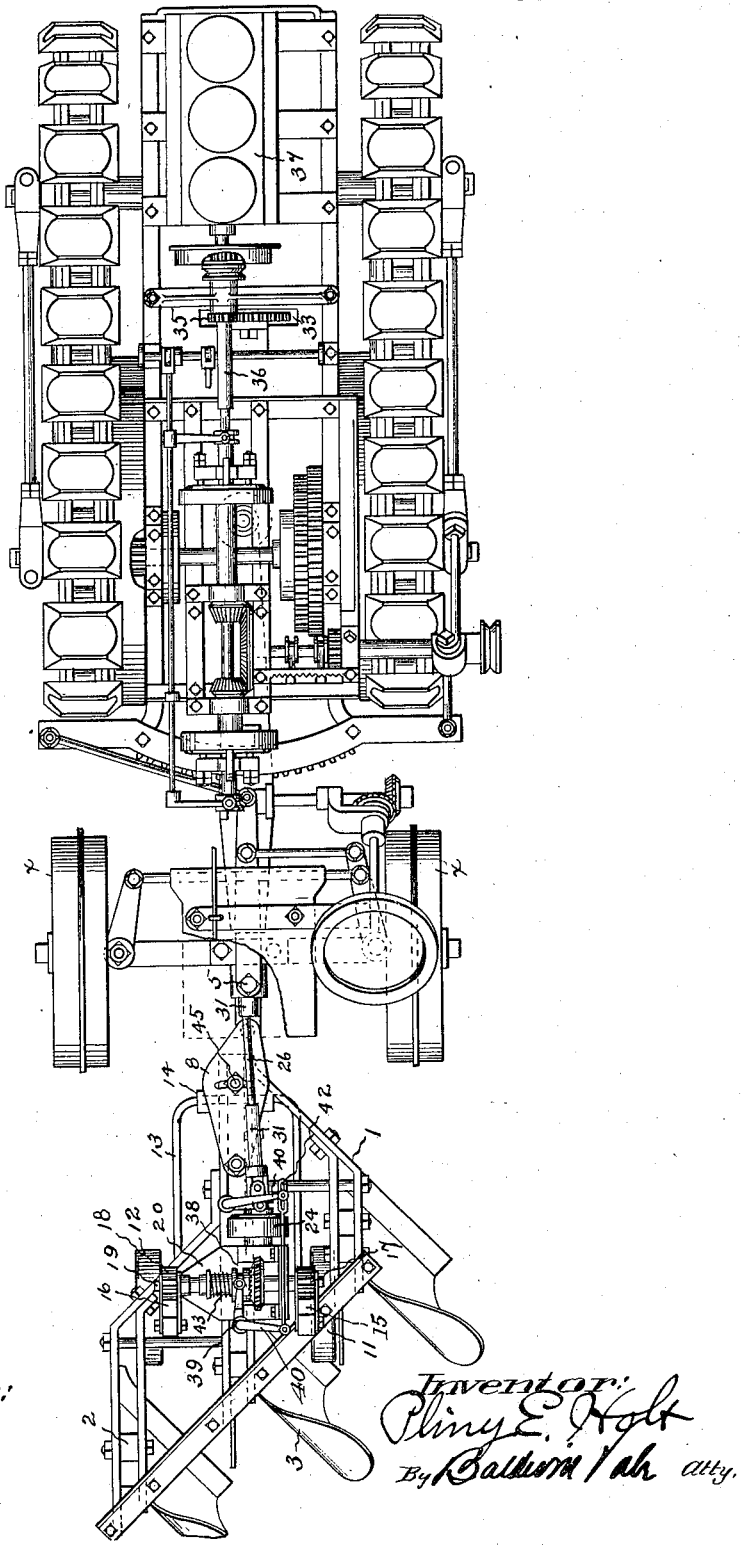

UNITED STATES PATENT OFFICE.

PLINY E. HOLT, OF PIEDMONT, CALIFORNIA.

TRACTOR-PLOW.

1,179,183.   Specification of Letters Patent.   Patented Apr. 11, 1916.

Application filed October 16, 1912. Serial No. 726,088.

*To all whom it may concern:*

Be it known that I, PLINY E. HOLT, a citizen of the United States, and a resident of Piedmont, Alameda county, State of California, have invented new and useful Improvements in Tractor-Plows, of which the following is a specification.

This invention relates to improvements in traction plows and more particularly to raising and lowering mechanisms therefor.

The objects sought to be accomplished are to provide a gang plow adapted to be directly coupled to an auto-tractor and provided with a power raising and lowering mechanism deriving its power from the auto-tractor and under the immediate control of the tractor operator.

Broadly stated, the invention consists of a plow frame carrying one or more plows, a supporting mechanism pivoted to the plow frame, and raising and lowering mechanisms interposed between the supporting mechanisms and the plow frame; and transmission mechanisms interposed between the raising and lowering mechanism and the prime mover of the tractor by which the plows are mechanically raised and lowered.

In the drawings: Figure 1 is a side elevation of a gang plow constructed in accordance with this invention attached to an auto tractor of the caterpillar type. Fig. 2 is a plan view of the same. Fig. 3 is a detail plan view from above of the raising and lowering mechanism of the plow. Fig. 4 is a side elevation partially in cross section, taken on the line 4—4 of Fig. 3. Fig. 5 is a detail in plan illustrating the manner of hitching the plow frame to the tractor, also the manner of adjusting the "gather" of the plow.

In detail the construction consists of the main frame 1 having the standards 2 upon which are mounted the plow body 3. The forward end of the plow is attached to the steering truck by the draft bar 4 and the coupling pin 5, engaging the coupling 6. The bolt 7 extending between the plates 8 and 9 engages the coupling. The running nuts 10 on the bolt provide vertical adjustment for the coupling. The forward end of the plow frame is thus carried and guided by the draw bar of the tractor, and the steering wheels *x*.

The plow frame is supported by the rollers 11 and 12 mounted upon the radius rods 13 that extend forward and are pivoted in the block 14 attached to the front end of the plow frame. The major portion of the weight of the plow is carried upon these rollers. Rack bars 15 and 16 are pivoted near these rollers and extend upward and engage the pinions 17 and 18 fixed on the shaft 19. This shaft is journaled in the base 20, mounted upon the plow frame.

The worm gear 21 is fixed on a sleeve rotatable on the shaft 19 and enmeshed with the gear worm 22, fixed on the shaft 23. This shaft 23 is journaled in the base 20 and provided with the friction socket 24. The clutch cone 25 is mounted upon a shaft 26 stepped into a recess provided in the friction socket 24. The cone is adapted to be thrown into and out of frictional engagement with the socket 24. This clutch is operated by the yoke 27 pivoted at 28 upon the base 20 and engaging the hub 29 of the friction head. The tumbling shaft 26 is provided with a universal joint 30 and the slip joint 31. A continuation of the shaft 26 is provided with the universal joint 32 near the pivotal engagement of the plow frame with the tractor draw-bar. From this point the shaft 26 continues forward, being mounted in suitable bearings fixed upon the tractor frame. The shaft 26 receives its rotation through the gear 33 splined thereon and enmeshed with the pinion 35 fixed upon the transmission shaft 36 geared to the prime mover. Thus rotation is transmitted from the prime mover 37 of the tractor to the raising and lowering mechanism mounted upon the plow.

The shaft 19 is provided with the jaw clutch 38 splined thereon and controlled by the yoke 39, pivoted upon the base 20 and manually operated by the crank lever 40 that is connected to the link 41. Manipulation of the lever 40 throws the clutch cone 25 controlled by the yoke 27 into and out of engagement. The friction clutch and the jaw clutch 38 are independently operated by the connecting link 41, the slot 42 permitting the withdrawal of the friction clutch prior to the disengagement of the jaw clutch, the latter being engaged by the spring 43. With the friction clutch disengaged and the jaw clutch engaged the plow frame is locked at the desired height by the irreversibility of the worm gear. The rotation of the shaft 19 causes the pinions 17 and 18 to climb up the racks 15 and 16 lifting the plow frame and the plows clear of the ground or the desired height, throwing the support upon the rollers 11 and 12 and the tractor for transportation. The plow is dropped into operative position by withdrawing the clutch 38.

The "suction" of the plow bodies is adjusted by the running nuts 10 raising or lowering the front of the plow frame. The "gather" of the plow is controlled by the adjusting slots 44 in the plates 8 and 9, the bolt 45 locking the lateral adjustment of the front of the plow frame.

By this close coupling of the plow directly to the tractor, a very compact combination results, making it possible to plow "close up" in fence corners or restricted spaces. It is also possible to a limited extent to back up such an outfit which is not common in this art. All of the control mechanisms of both the plow and the tractor are concentrated within easy reach of a single operator who is capable of controlling every operation of the combination with ease.

It will be noted that the whole plow frame trails from a flexible connection with rear steering truck, but is susceptible of adjustment to regulate both "suction" and "gather" and at the same time the power connections for raising the plow frame adapt and adjust themselves to both the relative movements of the plow frame and steering truck and to the relative movements of the steering truck and body of the tractor carrying the engine. In other words the arrangement is such that the advantages of a rear steering tractor and trailing plow arrangement are secured in connection with the advantages of a power connection for raising the plow frame.

While the conventional type of mold board plow has been illustrated and described, disk plows or other types of implements coming within the application of this invention may be substituted therefor.

Having thus described this invention, what is claimed and desired to be secured by Letters Patent is:

1. In a traction plow, the combination with a tractor frame and a prime mover carried thereby, of a plow frame, a steering truck interposed between the tractor frame and the plow frame, raising and lowering mechanism carried by the plow frame, and means for operating said raising and lowering mechanism from the prime mover carried by the tractor frame, including a power connection between said device and said prime mover.

2. In a traction plow, the combination with a tractor frame and a prime mover carried thereby, of a plow frame, a steering truck interposed between the tractor frame and the plow frame, raising and lowering mechanism carried by the plow frame, and means for operating said raising and lowering mechanism from the prime mover carried by the tractor frame including a power connection between said mechanism and said prime mover and responsive to relative lateral angular relations assumed by the several frames.

3. In a traction plow, the combination with a tractor frame and a prime mover carried thereby, of a plow frame, a steering truck interposed between the tractor frame and the plow frame, raising and lowering mechanism carried by the plow frame and means for operating said mechanism from the prime mover carried by the tractor frame including a loose power connection between the three frames responsive to relative angular positions assumed by said frames.

4. In a traction plow, the combination with a tractor frame and a prime mover carried thereby, of a plow frame, a steering truck interposed between the tractor frame and the plow frame, raising and lowering mechanism carried by the plow frame, and means for operating said raising and lowering mechanism from the prime mover carried by the tractor frame including a drive shaft extending through and supported by the steering truck.

5. In a traction plow, the combination with the tractor frame carrying the engine, a rear steering truck pivotally connected with the tractor frame on a vertical axis, steering wheels pivotally connected with said steering truck on vertical axes and located in the rear of the pivotal connection between the truck and the tractor frame, and a plow frame jointed directly to the steering truck whereby the steering wheels will be held in engagement with the ground by the suction of the plows and the plows will be caused to follow the arc of the circle described by the tractor in turning curves.

6. In a traction plow, the combination with the tractor frame carrying the engine, of a rear steering truck pivotally connected with the tractor frame on a vertical axis and a plow frame jointed directly to the steering truck whereby the tendency of the steering truck to follow the arc of the circle described by the tractor in turning curves will be transmitted to the plow frame.

7. In a traction plow, the combination with the tractor frame carrying the engine, of a steering device associated with the tractor frame, and a plow frame coupled directly to and in the rear of the steering device, and arranged so that the suction of the plows will assist the tractor frame in maintaining the ground support of the steering device in operative contact with the surface of the ground.

8. In a plow structure having three articulated trucks adapted to assume lateral angular relations relatively to each other, the combination with a plow and its frame, of steering wheels and manually controlled steering mechanism carried by one of said trucks, and means whereby the suction of the plow will be transmitted to the steering wheels to keep them in normal contact with the surface of the ground.

9. In a traction plow, the combination with the tractor frame carrying the engine, a rear steering truck pivotally connected with the tractor frame, a plow frame flexibly connected with the steering truck, raising and lowering mechanism carried by the plow frame, means for operating said raising and lowering mechanism from the engine, including a drive shaft for the raising and lowering mechanism, extending through and supported by the steering truck, and a manually controlled clutch intermediate said shaft and the raising and lowering mechanism of the plow frame.

10. In a traction plow, the combination with the tractor frame carrying the engine, of a rear steering truck pivotally connected with the tractor frame, a plow frame flexibly connected with the steering truck, raising and lowering mechanism carried by the plow frame, means for operating said raising and lowering mechanism from the engine including a drive shaft for the raising and lowering mechanism, extending through and supported by the steering truck, and means operable from the steering truck for connecting the shaft with and disconnecting it from the raising and lowering mechanism of the plow frame.

PLINY E. HOLT.

Witnesses:
F. G. HOLT,
C. F. HOLT.